(12) United States Patent
Boot et al.

(10) Patent No.: US 9,499,049 B2
(45) Date of Patent: Nov. 22, 2016

(54) HYBRID VEHICLE COMPRISING A TORQUE DISTRIBUTOR

(71) Applicant: Iveco S.p.A., Turin (IT)

(72) Inventors: Marco Aimo Boot, Caselle Torinese (IT); Alessandro Bernardini, Genoa (IT); Giorgio Mantovani, Genoa (IT)

(73) Assignee: IVECO S.p.A., Turin (IT)

( * ) Notice: Subject to any disclaimer, the term of this patent is extended or adjusted under 35 U.S.C. 154(b) by 0 days.

(21) Appl. No.: 14/425,393

(22) PCT Filed: Sep. 6, 2013

(86) PCT No.: PCT/EP2013/068447
§ 371 (c)(1),
(2) Date: Mar. 3, 2015

(87) PCT Pub. No.: WO2014/037491
PCT Pub. Date: Mar. 13, 2014

(65) Prior Publication Data
US 2015/0258886 A1 Sep. 17, 2015

(30) Foreign Application Priority Data

Sep. 6, 2012 (EP) .................................. 12183275

(51) Int. Cl.
*B60K 17/346* (2006.01)
*B60K 17/354* (2006.01)
(Continued)

(52) U.S. Cl.
CPC ............. *B60K 17/3462* (2013.01); *B60K 6/52* (2013.01); *B60K 6/54* (2013.01); *B60K 17/344* (2013.01);
(Continued)

(58) Field of Classification Search
CPC ............. B60K 6/52; B60K 6/54; B60K 6/543; B60K 6/547; B60K 17/344; B60K 17/354; B60W 20/40; F16H 3/089
See application file for complete search history.

(56) References Cited

U.S. PATENT DOCUMENTS

| 4,441,379 A | 4/1984 | Malkowski et al. | |
| 5,513,719 A * | 5/1996 | Moroto ................... | B60K 6/48 180/65.21 |

(Continued)

FOREIGN PATENT DOCUMENTS

| DE | 19652971 | 6/1998 |
| EP | 2476932 | 7/2012 |

(Continued)

OTHER PUBLICATIONS

European Patent Office, Communication pursuant to Article 94(3) EPC for Application No. 12 183 275.2-1752, Apr. 4, 2016, 7 pages.

(Continued)

*Primary Examiner* — Dale W Hilgendorf
(74) *Attorney, Agent, or Firm* — Stetina Brunda Garred and Brucker

(57) ABSTRACT

Hybrid vehicle includes: an axle (FA, IA, RA); an internal combustion engine (CE); an auxiliary motor (AM); a torque distributor comprising a first transmission shaft (2) and a second transmission shaft (3) parallel to each other; and control means for controlling the torque distributor to switch to an electric traction mode by carrying out at least the following steps: acquisition of vehicle speed; and if the vehicle speed is non-zero, then selection of the most appropriate gear ratio among the at least two selectable gear ratios. The transmission shafts (2, 3) include two opposite ends ((21, 22), (31, 32)) and rotating connection means (7) including at least two selectable gear ratios (23/33, 24/34). The second end (22) of the first transmission shaft (2) is (Continued)

operatively connected/connectable with the axle (FA, IA, RA), and one end (31, 32) of the second transmission shaft (3) is operatively connected/connectable with the auxiliary motor.

25 Claims, 13 Drawing Sheets

(51) Int. Cl.
    *B60K 6/54*     (2007.10)
    *B60W 20/40*     (2016.01)
    *B60K 6/52*     (2007.10)
    *B60K 17/344*     (2006.01)
    *F16H 3/089*     (2006.01)
    *B60W 20/00*     (2016.01)
    *B60K 6/48*     (2007.10)
    *F16H 61/04*     (2006.01)
    *B60K 17/36*     (2006.01)

(52) U.S. Cl.
    CPC ............ *B60K 17/354* (2013.01); *B60W 20/40* (2013.01); *F16H 3/089* (2013.01); *B60K 17/36* (2013.01); *B60K 2006/4808* (2013.01); *B60K 2006/4825* (2013.01); *B60K 2006/4841* (2013.01); *F16H 2061/0422* (2013.01); *Y02T 10/626* (2013.01); *Y02T 10/6265* (2013.01); *Y10S 903/93* (2013.01)

(56) References Cited

U.S. PATENT DOCUMENTS

| | | | | |
|---|---|---|---|---|
| 5,950,750 A * | 9/1999 | Dong | ................... | B60K 17/344 180/24.08 |
| 6,041,877 A | 3/2000 | Yamada et al. | | |
| 6,306,057 B1 * | 10/2001 | Morisawa | ................ | B60K 6/48 475/5 |
| 6,468,175 B1 * | 10/2002 | Lehongre | ................. | B60K 6/50 180/65.235 |
| 6,490,511 B1 * | 12/2002 | Raftari | ................... | B60K 6/445 180/65.235 |
| 6,632,155 B1 * | 10/2003 | Hohn | ....................... | B60K 6/48 180/65.25 |
| 6,656,083 B2 * | 12/2003 | Esaki | ....................... | B60K 6/48 477/39 |
| 7,174,979 B2 * | 2/2007 | Ohta | ........................ | B60K 6/48 180/65.25 |
| 7,798,030 B2 * | 9/2010 | Lang | ........................ | B60K 6/48 74/331 |
| 2002/0024306 A1 * | 2/2002 | Imai | ....................... | B60K 6/442 318/34 |
| 2007/0267233 A1 * | 11/2007 | Wenthen | ................... | B60K 6/48 180/65.25 |

FOREIGN PATENT DOCUMENTS

| | | |
|---|---|---|
| EP | 2682293 | 1/2014 |
| EP | 2851232 | 3/2015 |
| FR | 2132989 | 11/1972 |
| FR | 2928583 | 9/2009 |

OTHER PUBLICATIONS

European Patent Office, Office Action for Application No. 1377362.4, Jun. 14, 2016, 6 pages.

Office Action of the corresponding Chinese patent application, Aug. 31, 2016, 8 pages.

* cited by examiner

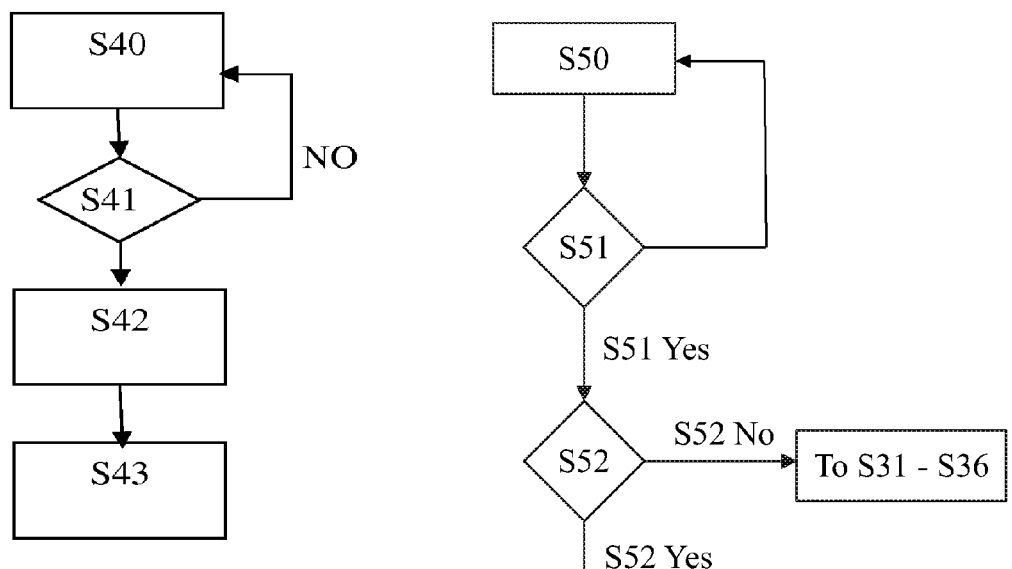
Fig. 20
Fig. 21a
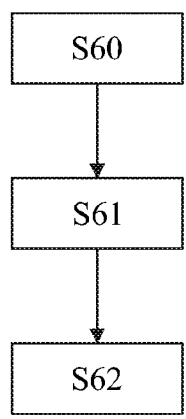
Fig. 21

HYBRID VEHICLE COMPRISING A TORQUE DISTRIBUTOR

CROSS REFERENCE TO RELATED APPLICATIONS

The present application claims priority to PCT International Application No. PCT/EP2013/068447 filed on Sep. 6, 2013, which application claims priority to European Patent Application No. 12183275.2 filed Sep. 6, 2012, the entirety of the disclosures of which are expressly incorporated herein by reference.

STATEMENT RE: FEDERALLY SPONSORED RESEARCH/DEVELOPMENT

Not Applicable.

APPLICATION FIELD OF THE INVENTION

The present invention refers to modular vehicle platforms that allow the production of vehicles having different construction characteristics, in particular having an auxiliary motor and/or a heat engine that can be configured according to different parallel hybrid or bimodal architectures.

DESCRIPTION OF THE PRIOR ART

Parallel hybrid architectures, wherein the electric motor is placed between gearbox and drive axle or between gearbox and internal combustion engine, are known in the art.

In any case, the electric engine is made ad-hoc for several reasons. The first reason is that when the electric engine is upstream of the gearbox, it is subject to the same speed of rotation of the heat engine, and to restrictive size constraints. Thus the active parts, rotor and stators, have to be made ad-hoc and, due to geometrical and speed constraints, they cannot be fully optimized from an electromechanical point of view.

On the contrary, when the electric motor is placed between gearbox and drive axle, it has to be dimensioned according to the torque, with a consequent increase of its weight and of its cost, since the transmission shaft between gearbox and axle is subject to a reduced speed of rotation, compared to the heat engine speed of rotation.

This results again in high manufacturing and raw material costs.

In addition, it is worth noting that the problems of the electric hybrid vehicles are completely different from those of vehicles for example equipped with additional non-electric reversible motors, such as hydraulic motors, etc.

Thus the technique known in the art uses completely different layouts according to the vehicle type.

In vehicles having permanent four-wheel drive configurations with the internal combustion engine arranged longitudinally, devices to transfer the driving torque to the front and to the real axle are known. Such transfer devices TU comprise a case including two parallel shafts, operatively connected in rotation between each other. The shafts may be connected between each other in a permanent and fixed way, or they may be operatively connected only on demand, for example when the rear axle skids. In such circumstance, the driving torque is transferred from one shaft to the other by means of particular clutches and not by means of a fixed gear ratio.

Examples of prior art systems are described in US2007/267233 and U.S. Pat. No. 6,041,877.

However said documents do not describe how to manage the switching from combustion-engine-only mode to an auxiliary-motor-only mode.

SUMMARY OF THE INVENTION

Therefore an aim of the present invention is to provide a system for appropriately operating such torque distributor, and in particular during the procedure of switching from the combustion-engine-only mode to the auxiliary-motor-only mode in a hybrid vehicle provided with said torque distributor.

The object of the present invention is described in claim 1.

Advantageously such modular torque distributor allows not only to use a single construction platform for vehicles with different engines and layouts, but also to use auxiliary motors, not only electric, for parallel, bimodal or four-wheel drive configuration.

Another object of the present invention is a method of controlling the switching from combustion-engine-only mode to an auxiliary-motor-only mode in a hybrid vehicle provided with a torque distributor.

Several ground vehicles implementing such procedure are also object of the present invention.

The present invention is described better in the claims, which are an integral part of the present description, by describing preferred embodiments.

In the following, when the description states that at least an auxiliary motor is connected to an end of the second transmission shaft, it means that, when two auxiliary motors are present, one is operatively connected with a first end of the shaft, while the other is operatively connected with the second end of the second shaft. When a single auxiliary motor is present, in general it is possible to define a power takeoff.

When only the auxiliary motor is present for example when the vehicle is purely electric, the term auxiliary means only that the motor is connected with the second shaft, thus such term is not confusing in the light of the whole description.

According to all the following embodiment the second end of the first shaft of the distributor is operatively connected with the rear axle of the vehicle.

When the vehicle comprises also a combustion engine, the output shaft of its corresponding gear box is connected either to a front or intermediate axle or to the first end of the first shaft of the torque distributor.

In the following, "non-zero" means greater than zero, while connectable means that one end of a transmission shaft is controllable in order to be connected, through a respective clutch, with a vehicle axle. In addition, selectable means that at least one of the ratios

BRIEF DESCRIPTION OF THE FIGURES

Further purposes and advantages of the present invention will become clear from the following detailed description of a preferred embodiment (and of its alternative embodiments) and the drawings that are attached hereto, which are merely illustrative and non-limitative, in which:

FIGS. 17-21a show flowcharts relating to control examples of the device according to the FIGS. 1, 2, 15 and 16.

In the figures the same reference numbers and letters identify the same elements or components.

For more convenience, the reference numbers of the same components are not repeated in all the figures, to increase the readability of the figures themselves. Such reference numbers should be intended as repeated.

DETAILED DESCRIPTION OF PREFERRED EMBODIMENTS OF THE INVENTION

Figure 1:
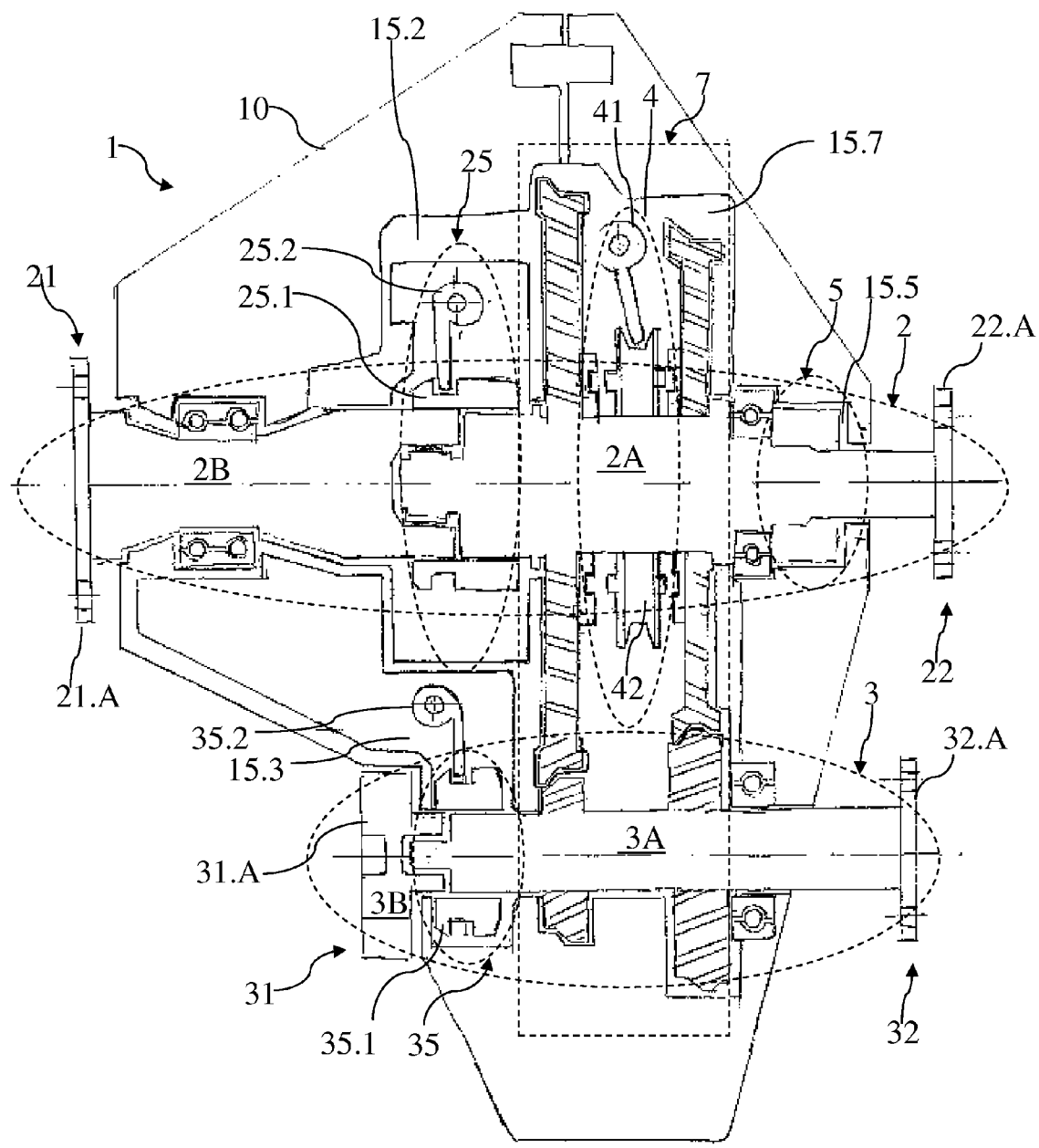
FIGS. 1, 2, 15 and 16 show mechanical schemes of alternative embodiments relating to a torque distributor that is object of the present invention.

With particular reference to FIG. 1, a torque distributor 1 that is object of the present invention is described.

It comprises an external case 10, which houses two shafts 2 and 3 parallel to each other. For more convenience, they will be indicated as first shaft 2 and second shaft 3.

The case 10 comprises four openings from which the ends 21 and 22 of the first shaft 2 and the ends 31 and 32 of the second shaft 3 can be reached.

The first shaft 2, according to some configurations described in detail in the following, is dimensioned in order to distribute remarkable torques, such as those generally provided by the internal combustion engines with two- (or more) stage superchargers downstream of the gearbox GS.

The second shaft 3, whose speed is in general equal to or higher than the first shaft 2 for reasons explained below, may have a smaller section than the first one 2, in order to distribute torques generated by engines having a lower power and torque than the ones acting on the first shaft 2.

The first end 21 of the first shaft 2 comprises a flange 21.A in order to be connected to a transmission shaft downstream to the manual or automatic gearbox per se known or to be connected to an input shaft of a drive axle, in general, but not exclusively, by means of a respective differential (D2).

The second end 22 of the first shaft 2 comprises a flange 22.A in order to be connected to an input shaft of a drive axle, in general, but not exclusively, by means of a respective differential.

Thus all the ends of the shafts can be reached from the outside.

The first end 31 of the second shaft 3 comprises a flange 31.A, preferably removable, in order to be connected to an auxiliary motor, for example electric or hydraulic, or to make a power takeoff, namely to be connected to a passive device, per se known, that absorbs driving torque from the torque distributor 1.

The second end 32 of the second shaft 3 comprises a flange 32.A, fixed or removable, in order to be connected to an auxiliary motor, for example electric or hydraulic, or to make a power takeoff, namely to be connected to a passive device, per se known, that absorbs driving torque from the torque distributor 1.

Advantageously, the presence of removable flanges allows to use the most suitable one without having to replace the transmission shaft.

Between the first 2 and the second shaft 3, rotating connection means 7 (23, 33 e 24, 34) are housed, in order to connect the two shafts 2 and 3 in rotation. According to a preferred alternative embodiment of the invention, the rotating connection means 7 comprise a gearwheel 23 that is coaxial and rotatably associated with the first shaft 2 and a gearwheel 33 that is fixed and coaxial with the second shaft 3, both gearwheels lying on the same rotation plane, so that they can mesh with each other in operating conditions.

According to another preferred alternative embodiment of the invention, the rotating connection means 7 comprise another gearwheel 24 that is coaxial and rotatably associated with the first shaft 2 and another gearwheel 34 that is fixed and coaxial with the second shaft 3, both gearwheels lying on the same rotation plane, so that they can mesh with each other in operating conditions. The fixed gear ratios defined by the pairs of gearwheels 23/33 and 24/34 are different between each other. The compartment 15.7 of the case 10 encloses the gearwheels 23/33 and 24/34.

In particular, with reference to the figures, the ratio 24/34 is defined as lower gear ratio, while the ratio 23/33 is defined as upper gear ratio.

Furthermore the torque distributor comprises selection means 4 for activating/deactivating such rotating connection means 7. In particular, when only one gear ratio is available, said selection means 4, if present, are suitable to allow the coupling of the gearwheel 24 (or 23) with the first shaft 2 by means of a clutch of the type dog clutch.

Thus, in this scope, the term clutch refers to a joint that can be coupled and decoupled and that is of the ON/OFF type.

When, on the contrary, two pairs of gearwheels are present, such selection means 4 define a double clutch of the dog clutch type, in order to make the gearwheel 24 or the gearwheel 23 integral with the first shaft 2 or in order to decouple both gearwheels 23 and 24 from the respective first shaft 2, determining the mechanical disconnection between the two shafts 2 and 3, namely the neutral condition.

If the selection means 4 are not present, then one single gear ratio is present and both gearwheels are integral with their respective rotation shafts.

An electromechanical or hydraulic or pneumatic actuator 41 actuates the axial movement of a pulley, axially sliding on the first shaft 2, between the two gearwheels 23 and 24. It is integral with the first shaft 2 in rotation, realizing, for example, an axial joint. The two opposite faces of the sleeve 42 comprise teeth or inserts suitable to engage the seats of the corresponding faces of the gearwheels 23 or 24, to make them integral with the first shaft 2 in rotation.

Such dog clutch, even though very inexpensive, is rarely used because it has no means to synchronize the two shafts 2 and 3, thus the clutch can be operated only where no torque is applied on the device 1. According to another aspect of the present invention, a pre-synchronism is obtained by operating the auxiliary motor and/or the heat engine so that the ratio between the two angular speeds is within an acceptable interval, with respect to the gear ratio to be engaged.

For example, if the gear ratio to be engaged is 1:2, then the auxiliary motor is operated so that the second shaft has twice the angular speed of the current angular speed of the first shaft. Similarly, if the gear ratio to be engaged is 1:4, then the second shaft 3 is driven by the auxiliary motor to an angular speed that is about four times the current angular speed of the first shaft.

According to a preferred alternative embodiment of the invention, the external case 10 comprises also a first housing 15.2 to house a first clutch 25 to mechanically connect/disconnect the first end 21, portion 2B, with/from the first shaft 2—portion 2A. Preferably, also such clutch is made by a dog clutch joint or by an internally toothed bushing 25.1, axially sliding on the first shaft 2. Also the two portions 2A and 2B of the shaft 2, that can be coupled by the bushing 25.1, are shaped in a complementary way with respect to the bushing in order to obtain the operating connection of the two portions 2A and 2B. An electromechanical or hydraulic actuator 25.2 controls the axial sliding of the bushing 25.1.

According to a further embodiment of the present invention, a pre-synchronism is obtained by operating the auxiliary motor, the heat engine and the gearbox before closing the clutch 25 on the first end 21 of the first shaft 2 and/or before closing the clutch 25 on the end 31 or 32 of the second shaft, to which the auxiliary motor is connected.

According to another preferred alternative embodiment of the invention, the external case 10 further comprises a second housing 15.3 to house a second clutch 35 to mechanically connect/disconnect the first end 31 (portion 3B) of the second shaft 3 (portion 3A). Preferably such clutch 35 has the same characteristics of the clutch 25: thus a dog clutch can be used. As an alternative, the two portions 3A and 3B of the shaft 3 can be coupled by means of the bushing 35.1 and/or shaped in a complementary way to the bushing itself to obtain the operating connection of the two portions 3A and 3B, when the bushing slides axially engaging both portions 3A and 3B. An electromechanical or hydraulic or pneumatic actuator 35.2 controls the axial movement of the bushing 35.1.

Different clutches can be used, but these ones are considered to be the most simple and inexpensive to be adopted. Although inexpensive, they are not suitable to be actuated when shaft 2 and shaft 3 have different angular speed. The present invention has overcome also this problem, by means of the aforementioned pre-synchronism realized by means of the auxiliary motor and/or by the heat engine.

It is worth specifying that the dog clutches are of the ON/OFF type, namely they do not allow the reciprocal sliding between the shafts.

According to a further alternative embodiment of the invention, at least a further clutch (26 and/or 36) is housed or can be housed in the case 10 to mechanically disconnect the end 22 of the shaft 2 from the shaft 2 and/or to mechanically disconnect the end 32 of the shaft 3 from the shaft 3.

A clutch 26 on the end 22 of the shaft 2, as it will be explained below, is extremely advantageous for operating the electric motor that functions as a generator connected to the second shaft, also when the vehicle is stationary, namely its speed is zero.

The external case 10 preferably comprises also block means 5, in its compartment 15.5, suitable to prevent any rotation of the second end 22 of the first shaft 2 with respect to the case 10. Such block means are useful to block the vehicle, regardless of the engagement of the parking brake and they may be realized in several different ways. According to preferred alternative embodiment, not shown, an actuator moves a latch until it interferes with an element radially projecting with respect to the first shaft 2.

According to another preferred alternative embodiment, shown in the figures, the bushing 25.1 may slide towards the right of the figures, firstly disconnecting between each other the portions 2A and 2B of the first shaft 2, and secondly interfering with an internal part of the external case of the device, blocking any rotation of the portion 2A of the first shaft. According to such alternative embodiment, when a clutch 26 is present on the second end of the first shaft 2, the activation of the block means 5, made by the bushing itself 25.1, automatically determines the engagement of such clutch 26.

Figure 2:
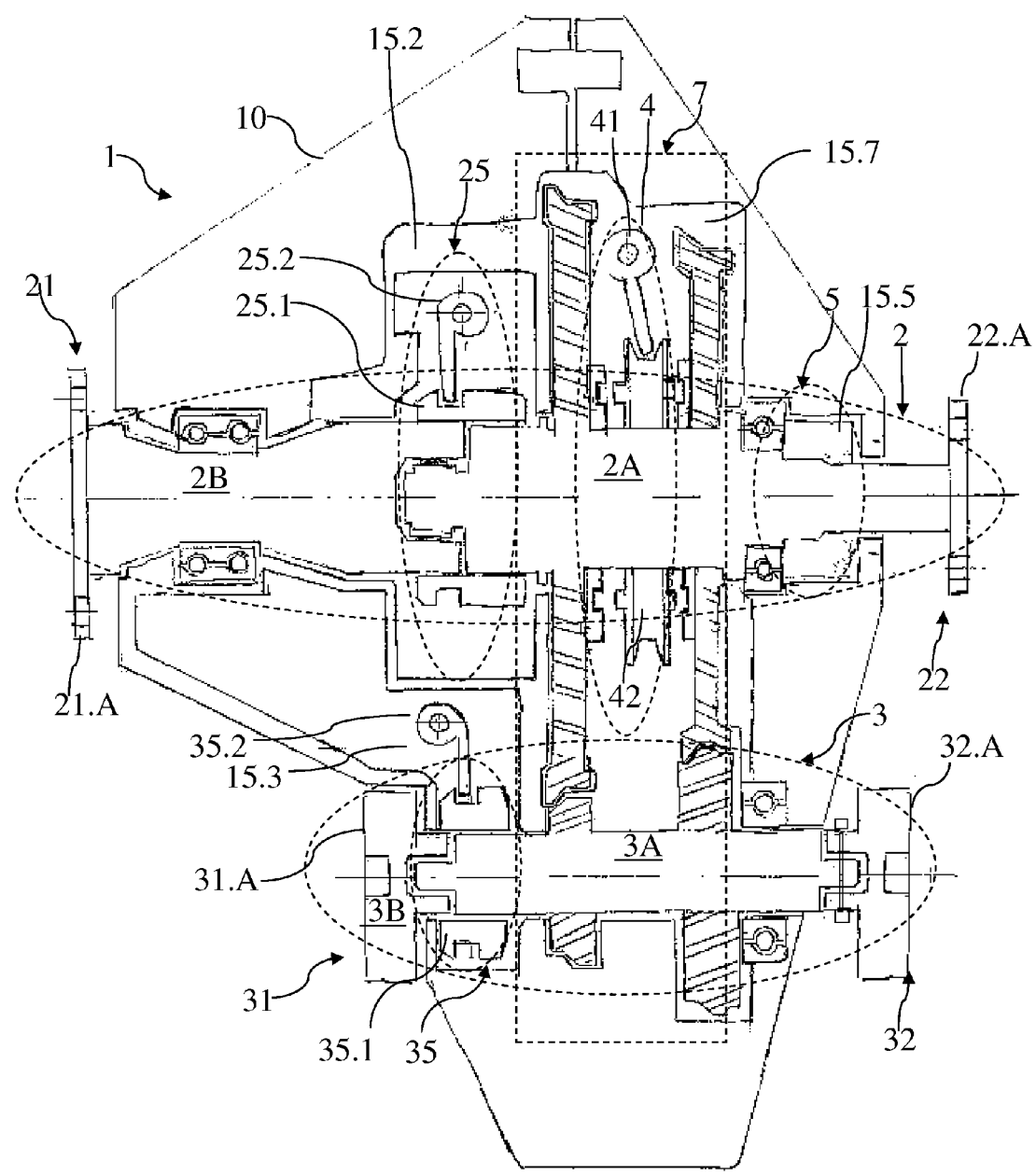

FIG. 2 shows an alternative embodiment of the device of FIG. 1, wherein the second end 32 of the second shaft 3 is similar to the corresponding first end 31.

Advantageously, since the first shaft 2 can be disconnected from the second shaft 3, in the configurations including an internal combustion engine, it is possible to define a power takeoff having torque and speed of rotation independent from the torque and the speed of rotation delivered by the internal combustion engine.

Advantageously, when the auxiliary motor is electric, since there is a clutch on the second end 22 of the first shaft 2, it is possible to keep the auxiliary motor running also when the vehicle is stationary, for example when it is necessary to charge the batteries using the heat engine in points of work with the highest efficiency. Such configuration can be obtained also with those engines having the motor-generator connected with the flywheel of the internal combustion engine, but in such case the whole internal combustion engine is designed ad-hoc. On the contrary, thanks to the present invention, it is possible to obtain the advantages of such known solution, without having to redesign the internal combustion engine and without having to use an electric motor with specific characteristics. The auxiliary motor, in fact, may be of a generic type, above all because the presence of at least two fixed gear ratios makes it possible to keep its speed within an interval of revolutions per minutes compatible with its characteristics, without any need for particular measures to adapt to its construction characteristics. For example, when the auxiliary motor is an electric motor, it is not necessary to modify the construction characteristics of the winding both of the rotor and of the stator.

Advantageously, since there is a clutch on the second end 22 of the first shaft 2, it is possible to define a power takeoff characterized by two different delivered torque ratios/revolutions per minute. This is particularly advantageous for those special vehicles wherein the internal combustion engine has to provide an as much constant as possible torque.

In the following some exemplifying embodiments of the device that is object of the present invention are described.

It will be noted that, in all the examples, the distributor 1 is arranged in an intermediate position of the vehicle, the shafts 2 and 3 being parallel to the longitudinal axis of the vehicle. In particular it is arranged in the proximity of the rear axle, in general in an intermediate position of the vehicle when the axles are two and in an intermediate position of the second half of the vehicle when the axles are more than two.

EXAMPLE 1

Figure 3:
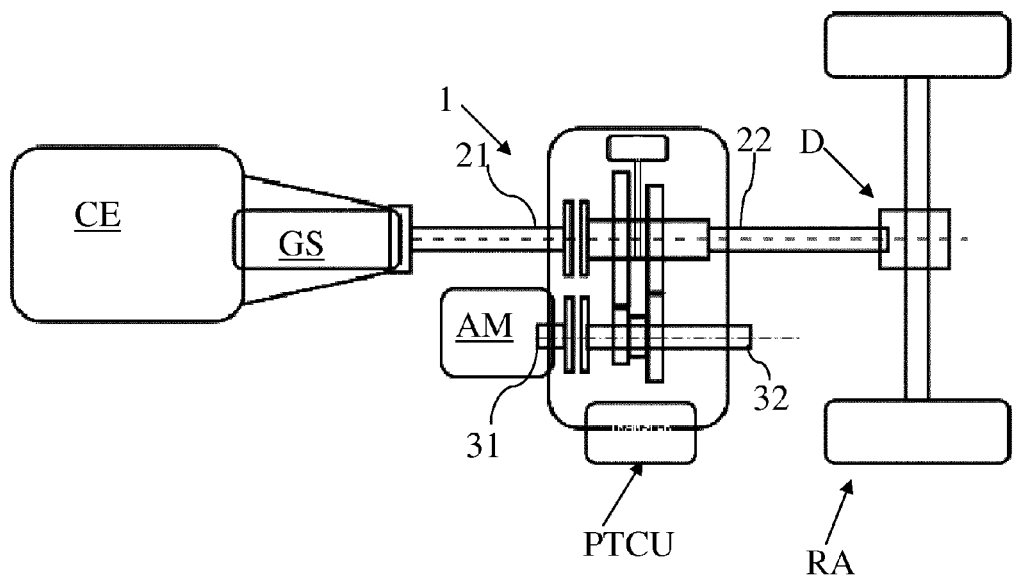
FIGS. 3-14 show implementation schemes of the device of the previous figures.

With particular reference to FIG. 3, an example of rear traction ground vehicle is shown. The torque distributor 1 is arranged between the front axle, not shown, and the rear drive axle RA. The internal combustion engine is arranged longitudinally and is equipped with manual, robotized or automatic gearbox GS, whose output shaft is connected to the end 21 of the first shaft 2. An auxiliary motor AM, for example electric or hydraulic or pneumatic, is connected to the end 31 or 32, of the second shaft 3 of the distributor.

The second end 22 of the first shaft 2 is connected with the rear drive axle RA and in particular to its differential D if present. The second end 32 of the second shaft 3 is not used, but is available for connecting a second auxiliary motor or to make a power takeoff.

EXAMPLE 2

Figure 4:
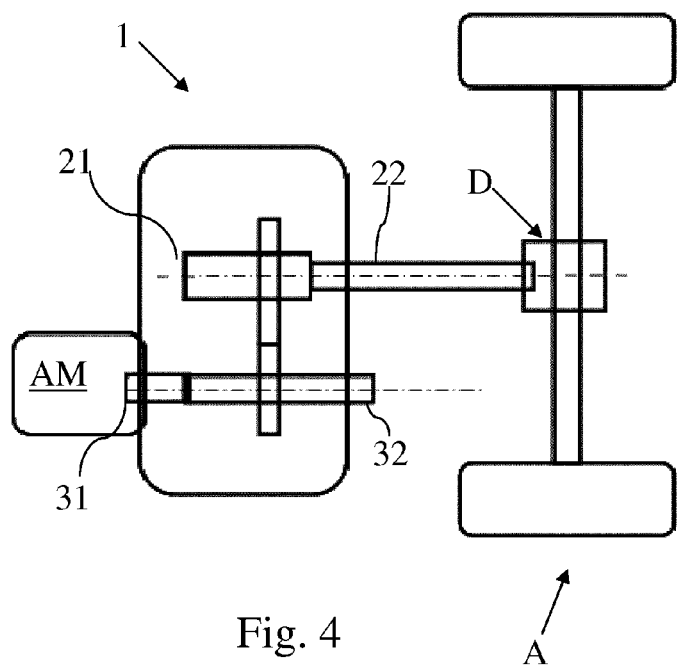
Figure 5:
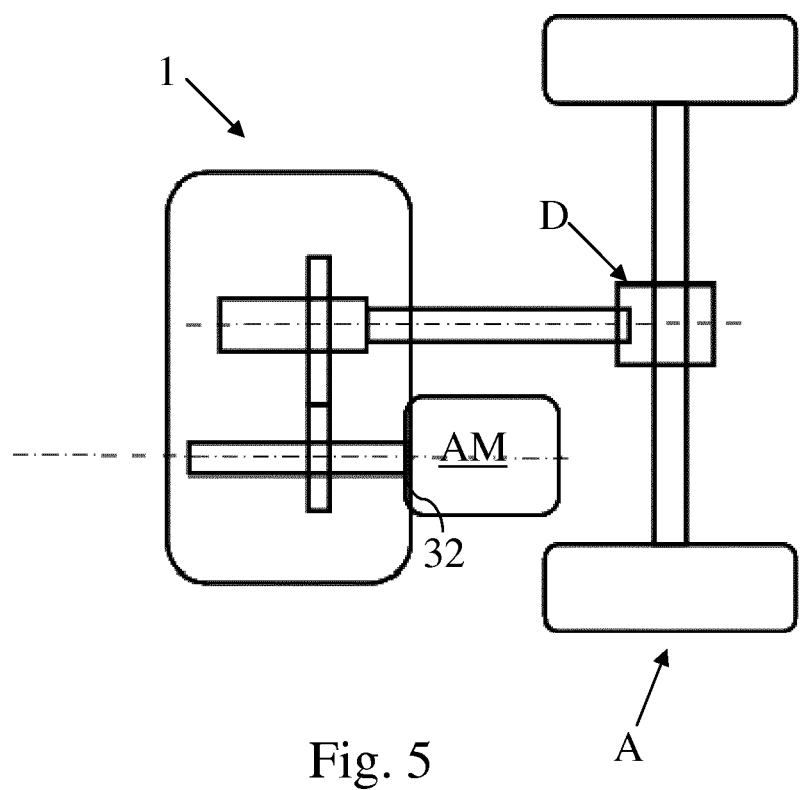
Figure 6:
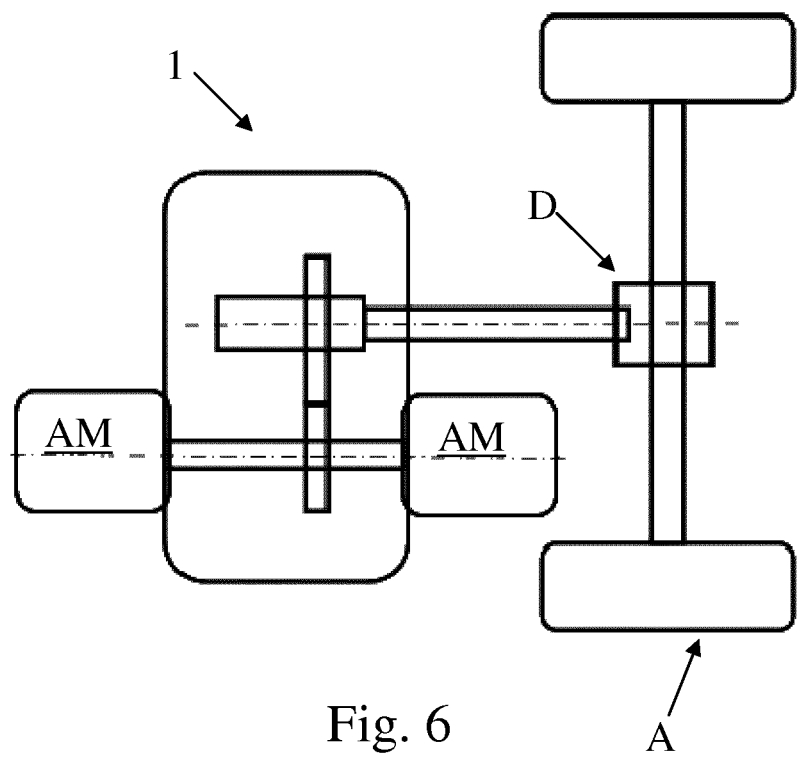

With reference to the FIGS. 4, 5 and 6, the torque distributor 1 according to the present invention is connected with the end 22 of the first shaft 2 and to any axle A of the vehicle. The end 21 is not used. An auxiliary motor AM, for example electric, is connected to the end 31 and/or 32 of the second shaft of the distributor. When at least one of the ends 31 or 32 is not connected to an auxiliary motor it is available to make a power takeoff.

Such configuration may be advantageously used in fully electric vehicles, or, as it can be seen in the following examples, in other hybrid configurations.

In FIGS. 4-6, it is possible to notice that only one gear ratio is shown. The clutches, actually, can be adopted according to the needs of each case.

EXAMPLE 3

Figure 7:
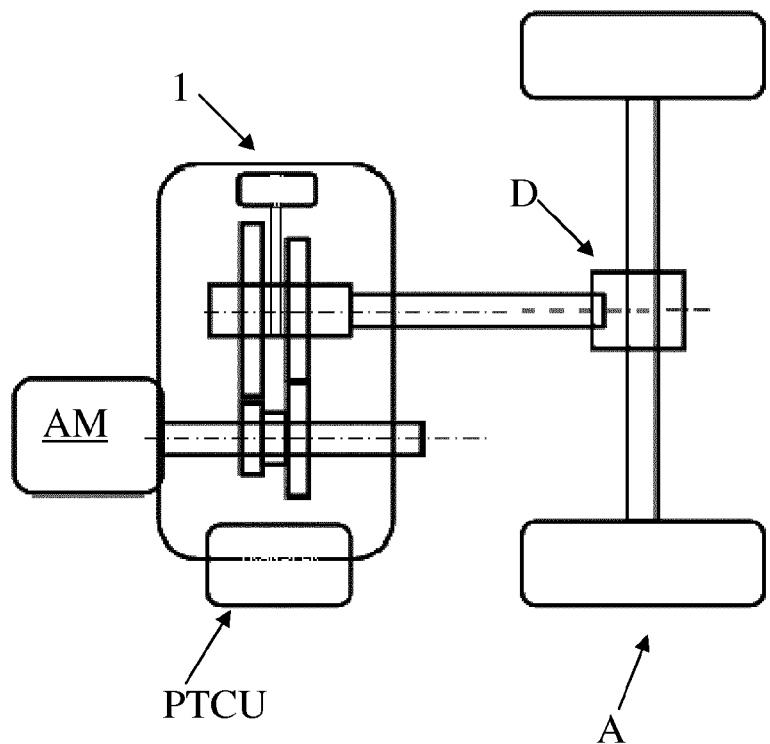

With reference to FIG. 7, the architecture shown uses a configuration among the ones described in the previous example 2, wherein the torque distributor comprises two gear ratios, namely two pairs of gearwheels. The vehicle has an internal combustion engine CE arranged transversally and operating on the lower axle FA, while the torque distributor delivers only the torque provided by the auxiliary motor AM to any of the other axles.

EXAMPLE 4

Figure 8:
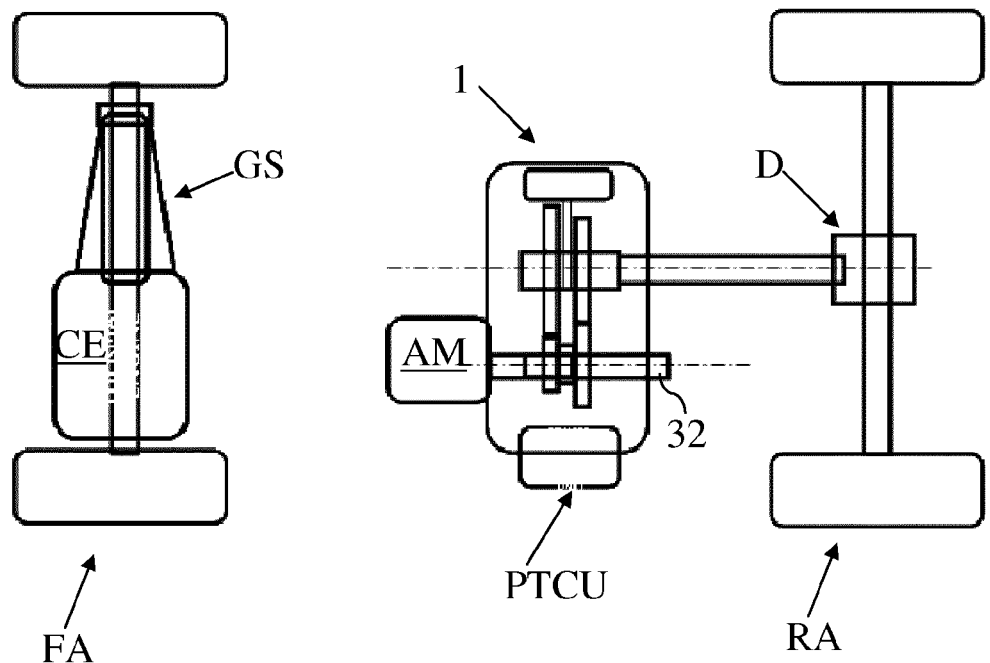

With reference to FIG. 8, with four-wheel drive on demand, the torque distributor 1 is connected to a rear axle RA of the vehicle, in the ways expressed by the previous examples 2 or 3.

The internal combustion engine CE with its respective gearbox GS is arranged transversally, operating the front axle FA of the vehicle.

With this configuration, there is a front-wheel drive when only the internal combustion engine is operating, while there is a rear drive when only the auxiliary motor AM is operating, or there is a four-wheel drive when both CE and AM are operating.

EXAMPLE 5

Figure 9:
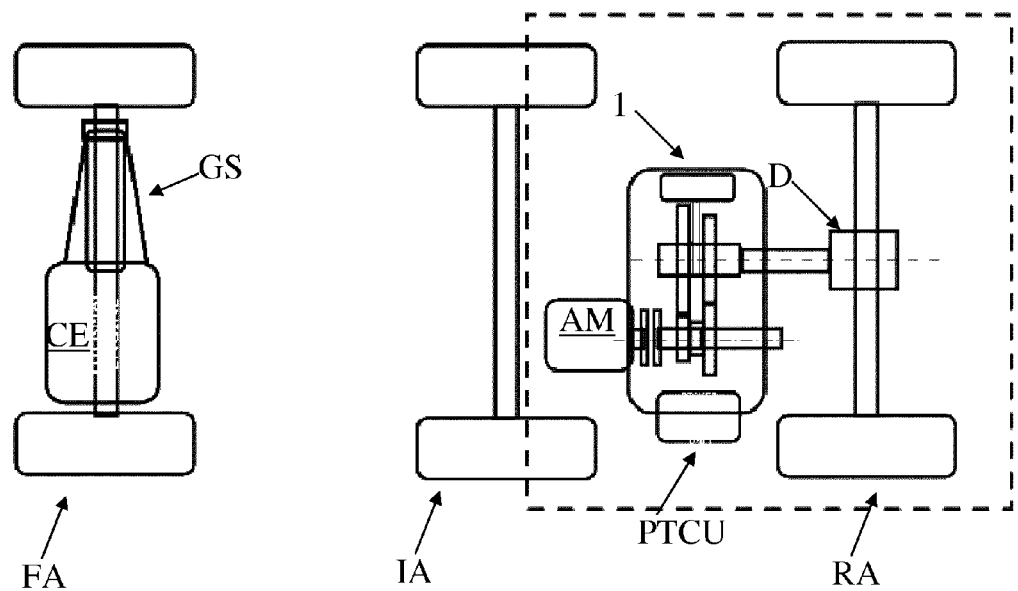

With reference to FIG. 9, a vehicle having three or more axles is shown, wherein, only by way of example, the rear axle RA realizes one of the examples 2 or 3 and the front axle is connected to an internal combustion engine CE with its respective gearbox GS arranged transversally with respect to the vehicle.

EXAMPLE 6

Figure 10:
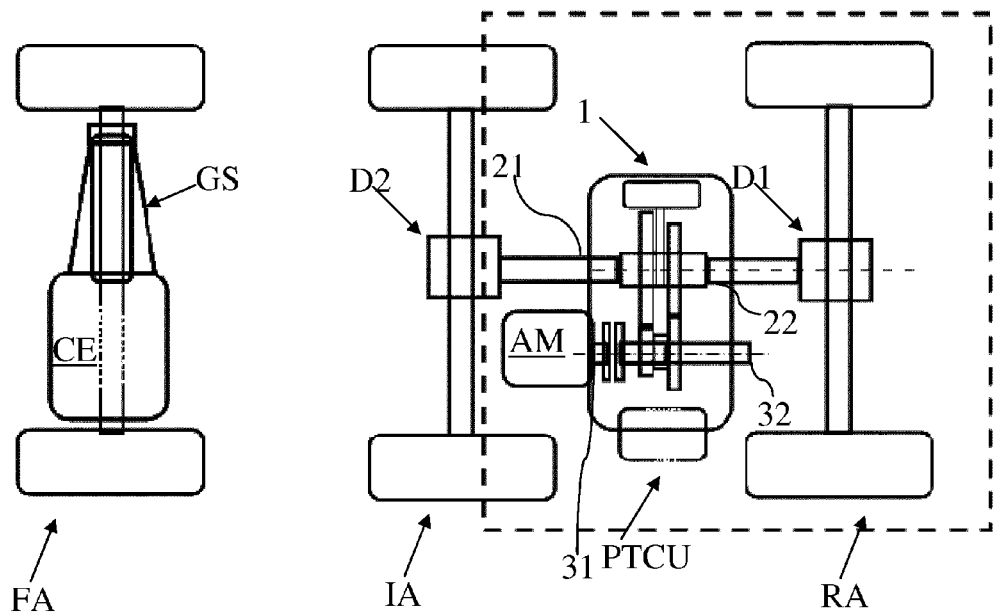

With reference to FIG. 10, the vehicle comprises at least three axles. One of those, for example the front axle FA, is connected to an internal combustion engine CE with its respective gearbox GS arranged transversally with respect to the vehicle, while the torque distributor 1 is connected by the first end 21 of the first shaft 2 with the differential D2 of a second axle, for example an intermediate axle 1A, and by the second end 22 of the first shaft 2 with the differential 01 of a third axle, for example the rear axle RA of the vehicle. An auxiliary motor AM is connected with the end 31 of the second shaft 3. According to this alternative embodiment, the axles IA and RA may be driving, when the auxiliary motor is operating. Moreover, in relation to the presence of a clutch on the first end 21 or on the second end 22 of the first shaft, one or both the axles may be drive axles, similarly to what was seen in example 5. The end 32 is made available for the connection of a second auxiliary motor that is or is not of a type similar to the first auxiliary motor, as shown in FIG. 6, or to make a power takeoff.

EXAMPLE 7

Figure 11:
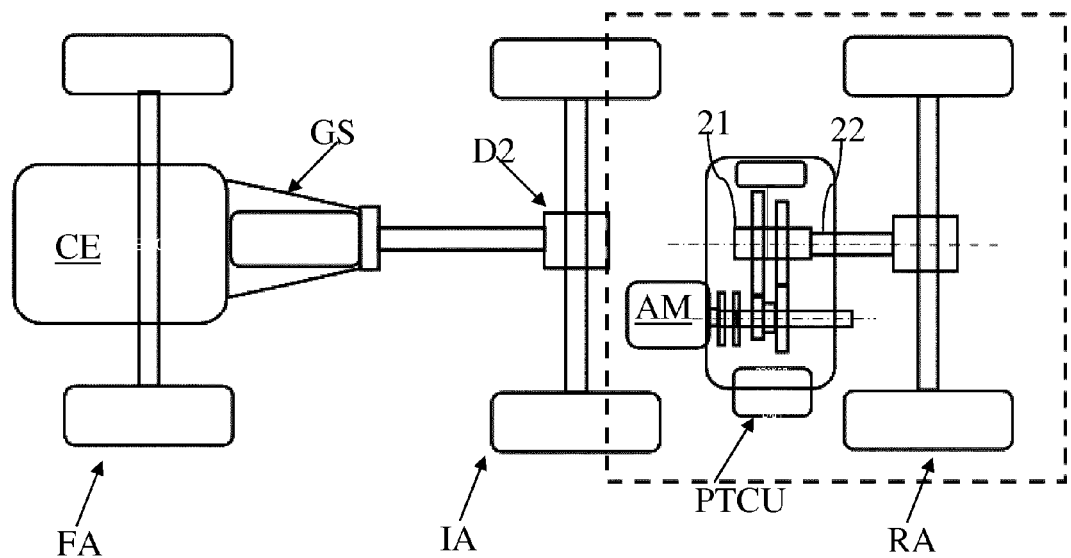
Figure 12:
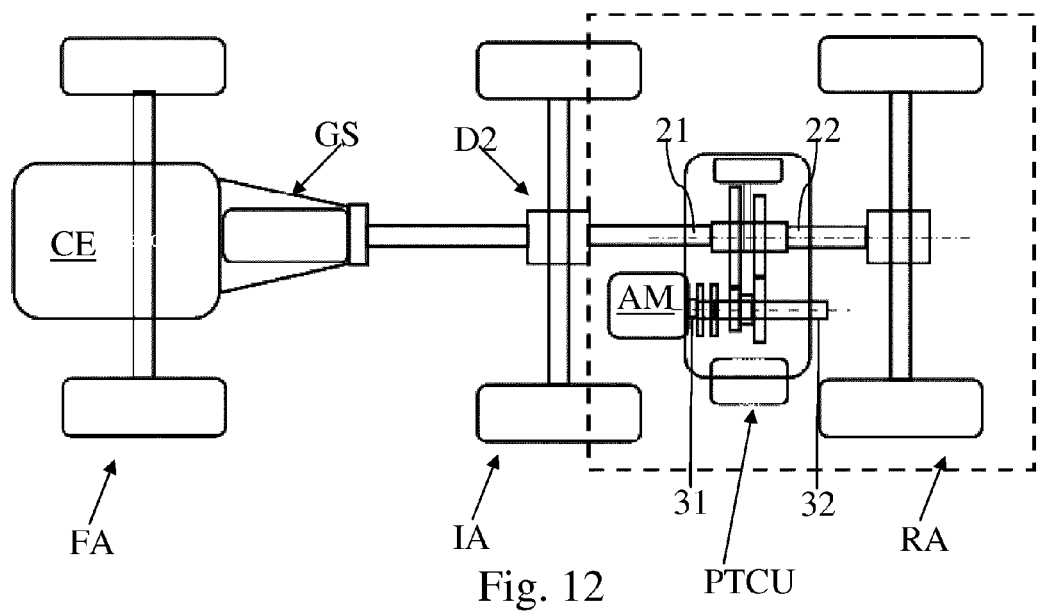

The present example, with reference to FIGS. 11 and 12, provides a three-axle configuration, wherein the internal combustion engine CE is arranged longitudinally, with its respective gearbox GS, acting on the intermediate axle IA.

The rear axle is connected to the end 22 of the first shaft 2 and at least one of the ends 31 or 32 of the second shaft 3 is connected to an auxiliary motor AM.

With reference to FIG. 11, the first end 21 of the first shaft 2 is free, namely it is not connected to any other part.

On the contrary, with reference to FIG. 12, the first end 21 of the first shaft 2 is connected with the differential D2 of the intermediate axle IA. Thus, both the intermediate axle IA and the rear axle RA may be driven at the same time by the internal combustion engine CE and/or by the auxiliary motor AM. Moreover, in relation to the presence of clutches on the first end 21 and/or on the second end 22 of the first shaft 2, both axles IA and RA or only one of them can be drive axles. Or the functional configuration of FIG. 11 can be reproduced. The end 32 (or 31) of the second shaft is made available for the connection of a further auxiliary motor of for defining a power takeoff.

EXAMPLE 8

Figure 13:
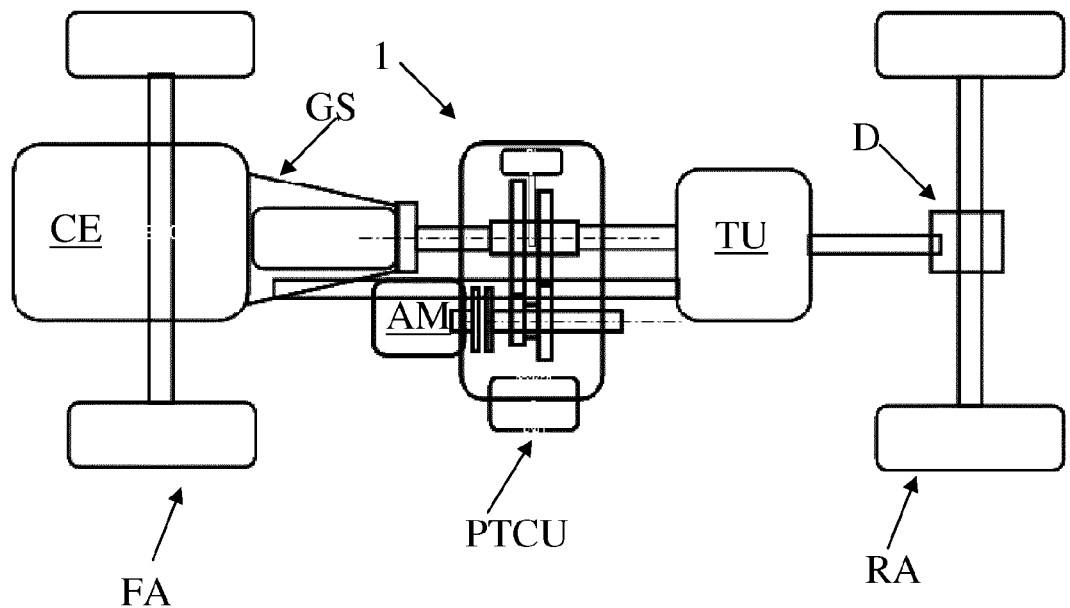

The present example, with reference to FIG. 13, shows a permanent four-wheel drive configuration, wherein the internal combustion engine CE and/or the auxiliary motor AM operate on both the front and the rear axle.

In this configuration, the internal combustion engine CE is arranged longitudinally. The output shaft of the gearbox GS is connected with the end 21 of the first shaft 2 of the torque distributor that is object of the present invention. The end 22 of the first shaft 2 is connected with the input of a torque transmission device TU as described above. The first output of such device is connected with the rear axle RA and the second output is connected with the front axle.

EXAMPLE 9

Figure 14:
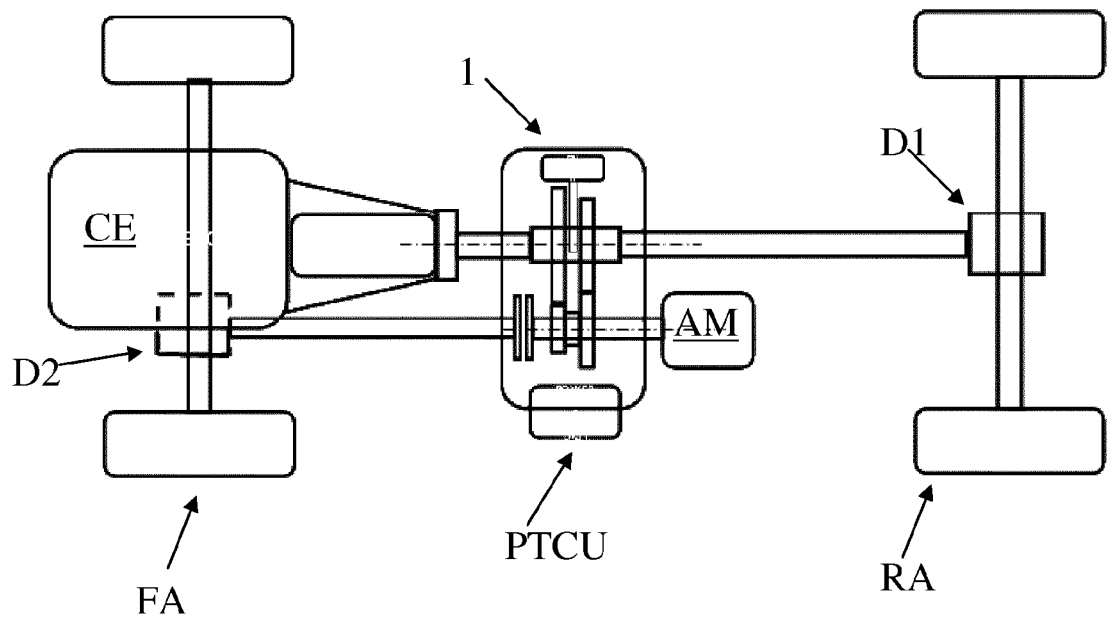

According to the present example, illustrated with the help of FIG. 14, it is possible to observe the absence, compared with FIG. 13, of the torque transmission device TU, per se known.

The second end 22 of the first shaft 2 is connected directly and operatively with the differential D1 of the rear axle RA, while the first end 31 of the second shaft 2 is connected directly with the differential D2 of the front axle FA. The auxiliary motor AM is connected with the second end of the second shaft 3 and, as in the previous example, the first end 21 of the first axle 2 is connected with the internal combustion engine.

From the figure, it is evident that the auxiliary motor is connected to the end of the second shaft 3, turned towards the rear axle.

In such configuration, it is preferable that at least one of the gear ratios is 1:1. Furthermore, if a double gear ratio is present, a clutch has to be present also on the first end 31 of the second shaft. So that, when the rear axle starts slipping, the most favourable ratio is selected and the clutch on the first end 31 of the second shaft is closed, transferring driving torque to the forecarriage.

Thus, according to such configuration, no power takeoffs are available if at least an auxiliary motor is connected to the device 1.

The examples shown here are merely illustrative, thus also their combinations are integral part of the present description. The alternative embodiments that follow may be combined as well with the alternative embodiments shown in the aforementioned examples.

Examples of preferred fixed gear ratios between the first shaft 2 and the second shaft 3, regardless of the presence of one, two or more fixed gear ratios are 1:1, 1:2, 1:4, 2:1, 4:1. They can be varied according to the average or maximum speed of rotation of the output shaft of the gearbox and to the construction characteristics of the auxiliary motor.

According to a preferred embodiment of the invention, the auxiliary motor may be electric or hydraulic or pneumatic.

When two auxiliary motors are present they can be of the same type, but with different characteristics, or they can be identical between each other.

For example, two electric motors can have different windings, to be used with different gear ratios and different speeds of rotation of the first shaft.

For example, a ratio 1:4 with a low-speed motor is very efficient at low-very low speed of rotation of the first shaft, both when it functions as a motor and when it functions as a generator. While at a high speed of rotation, a high-speed electric motor is more efficient.

In order to avoid increasing the motor speed too much, a clutch can be provided on the end of the second shaft to which such motor is connected, in order to disconnect the electric engine, when the vehicle speed exceeds a predetermined value.

According to another embodiment of the invention, the presence of the flanges 31.A and/or 32.A allows the mechanical coupling with shafts of auxiliary motors of different types. Thus the device 1 is compatible with electric or hydraulic or pneumatic motors with different mechanical interfaces that allow the transmission of the motion.

The possibility of housing the four possible clutches for connecting/disconnecting the four ends of the two shafts is now analyzed in greater detail.

For more convenience, a clutch on, for example, the first end indicates a clutch that disconnects the first end, etc.

For this purpose the configuration of FIG. 3 is firstly analyzed.

The clutch on the first end 21 of the first shaft allows to disconnect the internal combustion engine from the driveline of the vehicle, obtaining both an operating condition wherein only the internal combustion engine drives the vehicle, when the two shafts 2 and 3 are mechanically disconnected, and a hybrid operating condition, wherein both motors drive the vehicle, and a purely electric/auxiliary operating condition wherein only the auxiliary motor drives the vehicle.

The clutch on the second end 22 of the first shaft makes it possible to operate the auxiliary motor as a generator also when the vehicle is stationary. When only this clutch is present, all of the three aforementioned operating conditions can be reproduced, but in the purely electric condition, also the gearing of the gearbox GS are driven in rotation, assuming the automatic opening of the main vehicle clutch arranged between the internal combustion engine CE and the respective gearbox GS or assuming that the gear is in neutral.

A clutch on any of the ends of the second shaft may be adopted, in general, to allow both the auxiliary motor and the power takeoff to be decoupled from the driveline.

A clutch on any of the ends of the second shaft 3 intended to define a power takeoff allows its connection/disconnection in any operating condition of the vehicle, in particular in purely electric configuration or in hybrid configuration.

A clutch on the end to which the auxiliary motor is connected may be an alternative to the selection means 4 activating the coupling between the two shafts, in order to disconnect the auxiliary motor from the driveline. For the sake of clarity, the term driveline indicates all the components that, according to the operating conditions, transmit torque to the driving axle.

A configuration with a single fixed gear ratio may do not include selection means 4, thus the two shafts would always be coupled. Thus, in order to disconnect the auxiliary motor from the driveline, it would be necessary to have a clutch on the second shaft 3, in particular on the end connected to the auxiliary motor.

The clutch 35 on the first end of the second shaft 3 allows the mechanical disconnection of the auxiliary motor from the shaft 3. In such configuration it is possible to actuate the power takeoff only by means of the heat engine, without unnecessarily driving the auxiliary motor.

While the clutch 26 on the second end 22 of the first shaft 2 allows to actuate the power takeoff on the second end of the second shaft when the vehicle is stationary.

The disengagement is performed at zero torque, namely by keeping the clutch 42 in neutral position (by a pre-synchronism) and subsequently by actuating the clutch 35.1 so that the shaft of the auxiliary motor is mechanically disconnected from the shaft 3. Both the engagement and the disengagement of 25 and 35 are performed at zero torque.

With reference to FIG. 14, a clutch on the first end 21 of the shaft 2 and on the second end 32 of the second shaft 3 allow, respectively, the connection/disconnection of the internal combustion engine or of the auxiliary motor from the driveline. A clutch on the second end 22 of the first shaft 2 or on the first end 31 of the second shaft 3 allows the activation of the rear axle RA and of the front axle FA, respectively.

FIGS. 3 and 7-14 show devices 1 with a double gear ratio. In such circumstance, an electronic control unit PTCU (Power Transfer Control Unit) is always present to manage the actuation of the clutches on the device 1 and of the selection means 4. Such unit comprises interface means with the vehicle communication network (e.g. CAN network) for acquiring information from the heat engine control unit (ECU), from the transmission control unit (TCU), from the supervisor of the control the motor-generator AM, from the vehicle management unit (VMU). The PTCU is also able to transmit to the vehicle network the information about the clutch state and about the selection means 4 state. It is also responsible for the aforementioned pre-synchronism operations. In order to perform such pre-synchronism operations, the angular speed of the shafts has to be acquired. In order to perform the pre-synchronism on a clutch of the second shaft, the angular speed of the second shaft and of the auxiliary motor has to be acquired. This is possible by means of sensors and estimate devices per se known, appropriately arranged.

In general such PTCU control unit is present when at least one among
 selection means 4, also in presence on a single fixed gear ratio, or a clutch
is present in the device 1.

In case of a single gear ratio without selection means 4 and without any clutch, such control unit PCTU may be not present.

According to a main aspect of the present invention, the external case 10 of the device is a substantially closed case to contain shafts, clutches and gear ratios, etc. and comprises compartments having a longitudinal shape in order to house the shafts 2 and 3. Each one of such longitudinal shapes identifies opposite ends, wherein the compartment communicates with the outside. Thus the case is open towards the outside only in correspondence of the ends 21,22,31,32 of the transmission shafts 2 and 3.

Such case further comprises compartments to house the clutches 25,35,26,36 or the selection means 4, as needed.

When a clutch is present on a particular end, it means that such end is separate from the rest of the shaft, otherwise the shaft may be in a single piece with or it may be connected to such end by means of screws or other connection elements.

Preferably, for manufacturing needs, the ends are always separate from the body of the shaft 2A, 3A. They are associated to the body of the shaft in a fixed way, for example by means of screws, or by means of clutches, according to the vehicle configuration to be obtained.

If the clutches are not present, the ends 21,22,31,32 are fixed with respect to their respective shafts 2 and 3. For example, in FIG. 1, the flange 32.A is one and the same with the body 3A of the second shaft 3, or it is made so by means of connection means, as shown in FIG. 2.

FIGS. 1 and 2 show alternative embodiments of the device that can house a clutch 25 and a clutch 35 at most.

Figure 15:
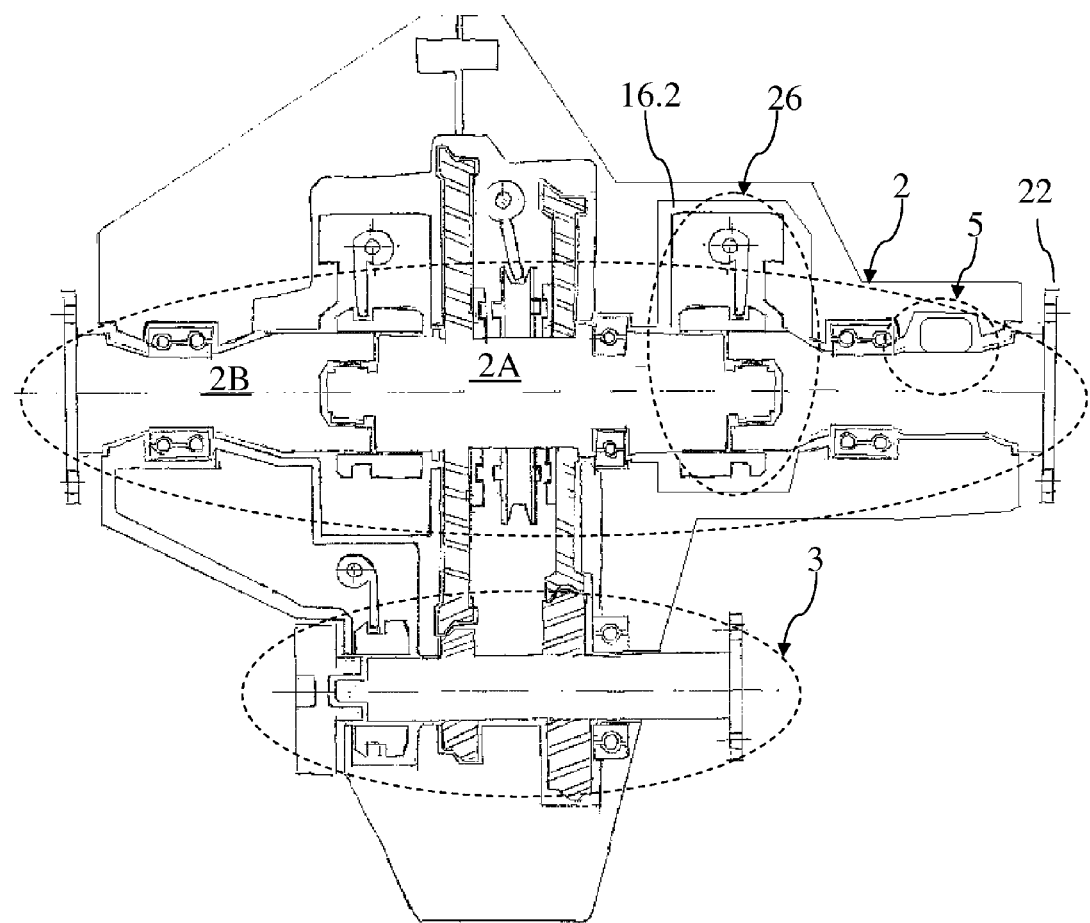

In FIG. 15 the device comprises also a clutch 26 on the second end 22 of the first shaft 2.

Figure 16:
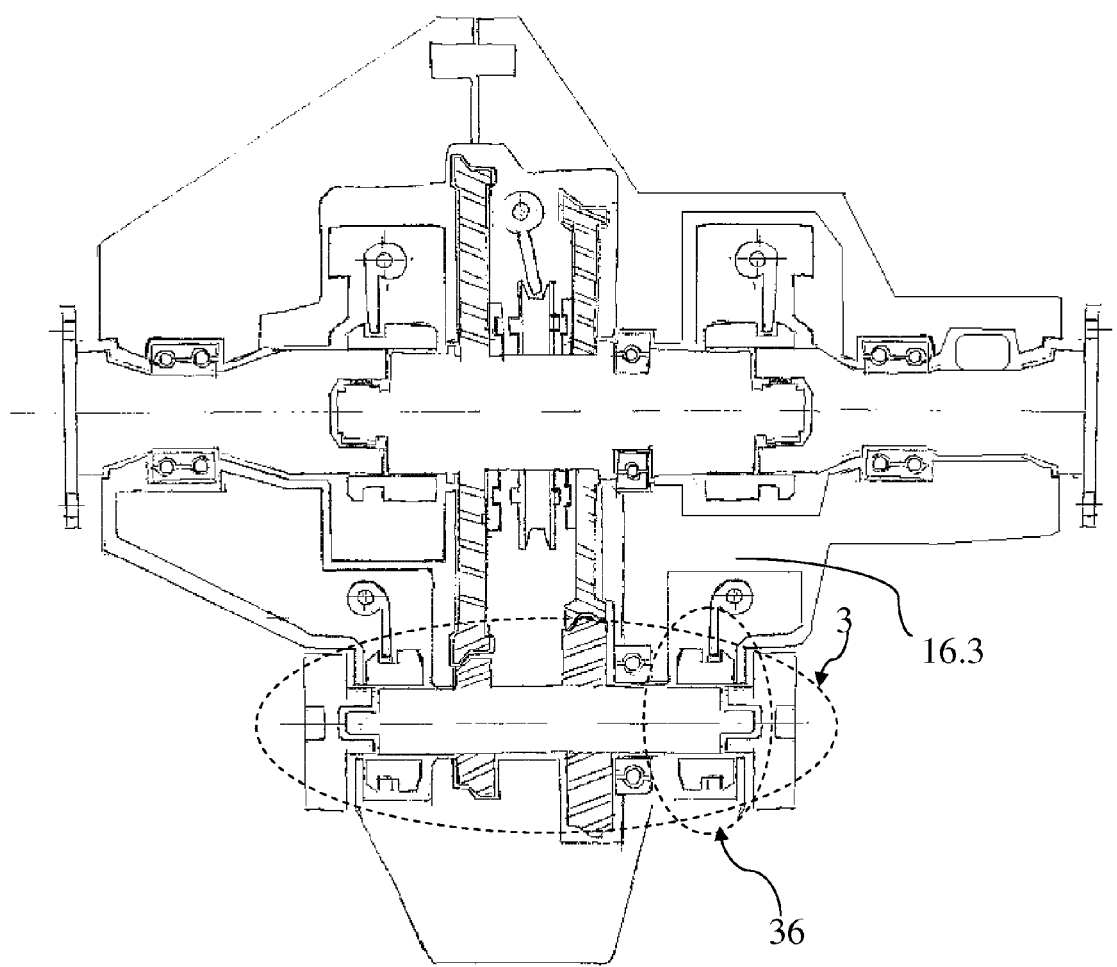

In FIG. 16 the device comprises also a clutch 36 on the second end 32 of the second shaft 3.

Thus, according to a preferred embodiment of the case 10, it comprises all four compartments 15.2, 15.3, 16.2 and 16.3 to house, respectively, the clutches 25, 35, 26, 36 and preferably to house at least the two pairs of gearwheels 24/34, 23/33 with their respective selection means 4.

According to a further aspect of the present invention, some operating strategies of the electronic control unit PTCU, in relation to some of the configurations described above, are now illustrated.

FIGS. 17-21 refer to the configuration shown in the example 1 FIG. 3.

The management of the device 1, in some circumstances, is coordinated among different on-board control units, such as PCTU, TCU and VMU and, possibly, the control unit managing the gearbox GS when it is automatic.

Figure 17:
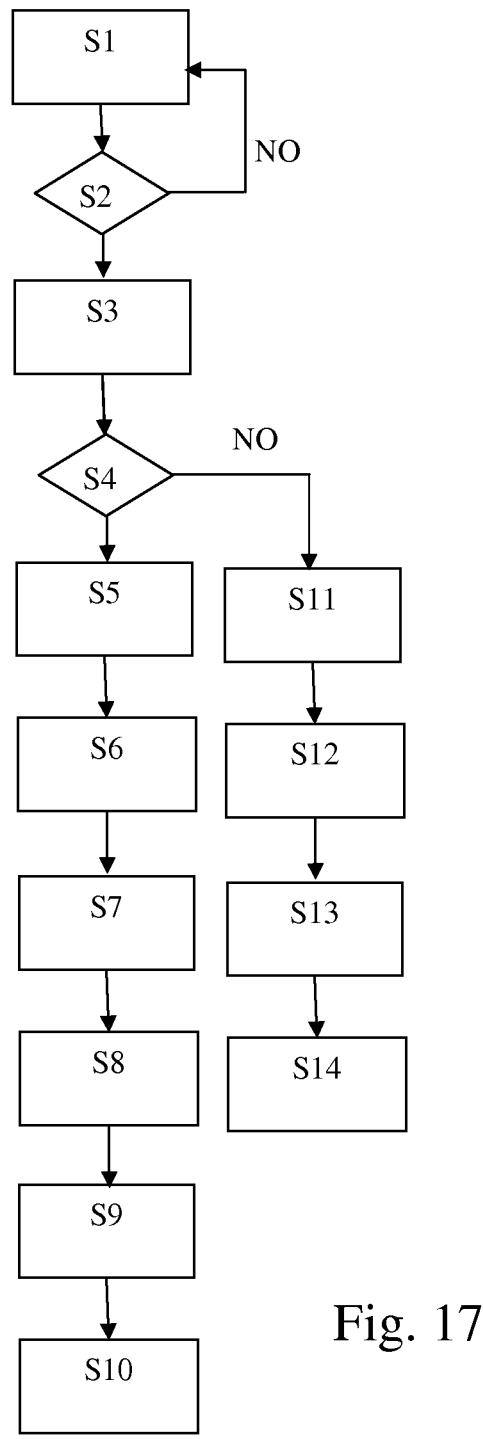

When a hybrid operating condition is selected and a purely electrical operation is required, according to some control strategies, the system performs, with reference to FIG. 17, some or all the following steps:
- (S1) Acquisition of vehicle speed, ON/OFF state of the internal combustion engine CE, batteries charging status (SOC>threshold);
- (S2) if the battery charging is sufficient, the following steps are performed, otherwise the procedure goes back to the previous step (S1);
- (S3) verification that there is no mechanical connection between the first (2) and second shaft (3), otherwise controlling said rotating connection means (7), specifically said selection means (4), in order to disconnect the first shaft (2) from the second shaft (3).
- (S4) if the vehicle is moving (S4 YES), namely its speed is "non-zero", then the following steps are commanded:
- (S5)
- if the first end (21) of the first shaft is provided of a clutch (25) then opening of said clutch (25) or
- if first end (21) of the first shaft is not provided of a clutch, then opening of a main clutch of the vehicle—between the internal combustion engine (CE) and its respective gearbox (GS)—and/or
- shift the gearbox (GS) in neutral;
- (S6) selection of the most appropriate fixed gear ratio (pairs 23/33 or 24/34),
- (S7) optionally, if the end of the second shaft (3) to which the auxiliary motor is connected AM is provided with a clutch, then, closing of said clutch;
- (S8) synchronization of the first (2) and second shaft (3),
- (S9) shifting to the most appropriate gear ratio,
- (S10) stopping of the internal combustion engine and inhibition of its starting;
- if the vehicle is stationary (S4 NO) then the following steps are performed:
- (S11)
- if the first end (21) of the first shaft is provided of a clutch (25) then opening of said clutch (25) or
- if first end (21) of the first shaft is not provided of a clutch, then opening of a main clutch of the vehicle—between the internal combustion engine (CE) and its respective gearbox (GS)—and/or
- shift the gearbox (GS) in neutral;
- (S12) optionally, if the end of the second shaft (3) to which the auxiliary motor is connected AM is provided with a clutch, then, closing of said clutch (35,36);
- (S13) downshifting to a lowest gear ratio (2434) in place of said selection (S6),
- (S14) inhibition of the internal combustion engine from starting.

The present method is performed cyclically until the purely electric operation is required.

When a step, for example S12, includes the formula "if present", it means that if the clutch is present it is closed, otherwise, if the clutch is not present the respective end of the shaft is fixedly connected to an external component, namely the auxiliary motor or the front axle or the rear axle or the output shaft of the gearbox GS.

Figure 18:
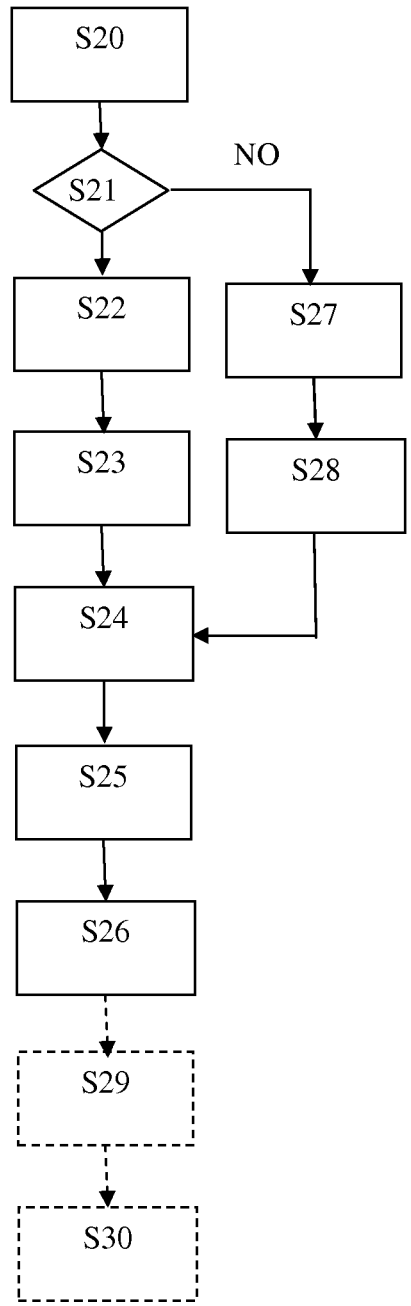

When a hybrid operating condition is selected and, according to some control strategies, the operation of the internal combustion engine alone is required the system performs, with reference to FIG. 18, some or all of the following steps:
- (S20) Acquisition of vehicle speed, ON/OFF state of the internal combustion engine CE;
- (S21) if vehicle speed is equal to zero (S21 YES)
- (S22) verification that there is no mechanical connection between the two shafts 2 and 3, otherwise activation of the selection means 4 to disconnect the two shafts 2 and 3;
- (S23) verification of the opening of the main clutch of the vehicle, otherwise opening of the clutch;
- (S24) internal combustion engine starting;
- (S25) closing of the clutch 25 on the first end 21 of the first shaft 2;
- (S26) opening of the clutch, if present, on the end of the second shaft to which the auxiliary motor AM is connected;
- if vehicle speed is not equal to zero (S21 NO) then the following steps are performed:

(S27) reduction of the torque delivered by the auxiliary motor below a specific value, to facilitate the mechanical disconnection of the gear ratios 23/33 or 24/34;

(S28) mechanical disconnection between the two shafts 2 and 3, after that step 24 and its following steps are performed.

If the vehicle gearbox is automatic, then the following optional steps are performed:

(S29) selection and shifting to the most appropriate gear of the gearbox GS;

(S30) closing of the main clutch of the vehicle (between engine CE and gearbox GS).

The present method is performed cyclically until the operation of the internal combustion engine alone is required.

Figure 19:
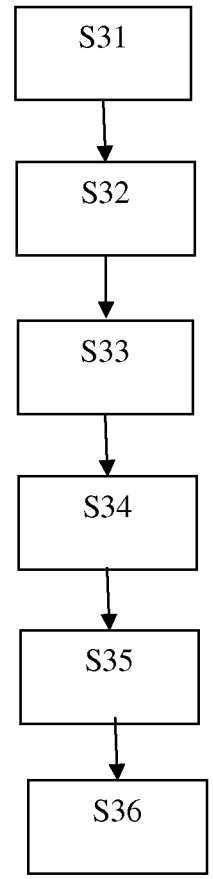

Regardless of the operating conditions, when the gear shifting of the means 7 is required, the following steps are performed with reference to FIG. 19:

(S31) acquisition of the currently used gear ratio;

(S32) selection of a different gear;

(S33) reduction of the torque delivered by the auxiliary motor below a specific value, to facilitate the mechanical disconnection of the gears 23/33 o 24/34;

(S34) mechanical disconnection of the gears 23/33 or 24/34;

(S35) synchronization of the shafts 2 and 3 in the manner described above;

(S36) engagement of a new gear ratio.

When the first shaft reaches higher angular speeds than the ones tolerated by the auxiliary motor, its disconnection is automatically commanded. With reference to FIG. 20, it comprises the following steps:

(S40) acquisition of vehicle speed and mechanical connection state of the two shafts 2 and 3 and of the clutch, if present on the end of the second shaft 3 to which the auxiliary motor AM is connected;

if the shafts 2 and 3 are mechanically connected to each other and the vehicle speed exceeds a predetermined threshold (for example 85 km/h) (S41 YES) then (S42) reduction of the torque delivered by the auxiliary motor below a specific value, to facilitate the disconnection of the meshing gearwheel (namely to configure the neutral)

(S43) clutch opening if present on the end of the second shaft 3 to which the auxiliary motor AM is connected, or, as an alternative, mechanical disconnection of the rotating connection means 7;

if the vehicle speed does not exceed said threshold or if the shafts are disconnected between each other, the method goes back to the beginning (S40).

The present method is repeated cyclically.

When the auxiliary motor has to contribute to the movement of the vehicle together with the internal combustion engine, firstly it is necessary to connect the auxiliary motor to the driveline by performing the steps from S1 to S9, then it is necessary to make it work in parallel with the internal combustion engine, possibly changing the gear ratio according to the vehicle speed and to the torque required by the driver.

When the vehicle is purely electric, as shown in the example 2, the PTCU performs the following steps to allow the movement of the vehicle, with reference to FIG. 21a:

(S50) Acquisition of vehicle speed, batteries charging status SOC>threshold;

(S51) if the battery charging is sufficient, the following step (S52) is performed, otherwise the procedure goes back to the previous step (S50);

(S52) if the vehicle speed is equal to zero (S52 YES)

(S53) verification that there is no mechanical connection between the two shafts 2 and 3, otherwise, activation of the rotating connection means to disconnect the two shafts 2 and 3;

(S54) downshifting to the lowest gear ratio;

(S55) deactivation of the block means 5 that have to be present in a purely electric vehicle;

(S56) management of the auxiliary motor according to the torque required by the driver;

If the vehicle speed is not null (S52 NO) the steps from S31 to S36 are performed.

If the vehicle speed is not null (S53 NO) the steps from S31 to S36 are performed.

The present method is repeated cyclically.

When the driver commands to stop the motor, the PTCU, with reference to FIG. 21, performs the following steps:

(S60) reduction of the torque delivered by the auxiliary motor until the vehicle speed is equal to zero;

(S61) disconnection of the rotating connection means 7;

(S62) activation of the block means 5.

When the vehicle is hybrid, the power takeoff can be connected or not connected to the driveline, depending on the state of the rotating connection means.

If a clutch is present on the second end 22 of the first shaft, the power takeoff may exploit either the internal combustion engine, or the electric motor, or both.

If it is desirable to decouple the rpm of the driveline from the rpm of the power takeoff, the means 7 have to be deactivated and the power takeoff may be powered by the auxiliary motor alone.

When both engines power the power takeoff, or when the vehicle is purely electric and the power takeoff is used when the vehicle is stationary, the block means 5 are previously activated.

According to another aspect of the invention, when it is desirable to have a regenerative braking, the method of FIG. 19 for changing the gear ratio of the means 7 is performed by selecting the lowest gear ratio, so that the motor-generator runs at its highest possible speed.

The control strategies described here may be adopted, where it is possible, on the different examples of schemes previously shown.

For example, the joint contribution of the two engines in the scheme of FIG. 3 may be determined only in relation to the torque required by the driver. In the scheme of the FIGS. 8, 9, 10, 11 and 14, the torque delivered by the auxiliary motor may be determined also in relation to the grip conditions of the axles. Thus, in this regard, further controls may be performed in order to control the torque delivery of the auxiliary motor, the closing of the clutches and the activation of the means 7.

The present invention may advantageously be realized by means of a computer program, which comprises program code means performing one or more steps of said method, when said program is run on a computer. For this reason the scope of the present patent is meant to cover also said computer program and the computer-readable means that comprise a recorded message, such computer-readable means comprising the program code means for performing one or more steps of such method, when such program is run on a computer.

It will be apparent to the person skilled in the art that other alternative and equivalent embodiments of the invention can be conceived and reduced to practice without departing from the scope of the invention.

From the description set forth above it will be possible for the person skilled in the art to embody the invention with no need of describing further construction details. The elements and the characteristics described in the different preferred embodiments may be combined without departing from the scope of the present application.

The invention claimed is:

1. Hybrid vehicle comprising
an axle (FA, IA, RA),
an internal combustion engine (CE) with its own gear box (GS), said gear box (GS) having one single output shaft,
at least one auxiliary motor (AM),
a torque distributor comprising
  a first (2) and a second transmission shaft (3) parallel to each other, wherein each transmission shaft (2, 3) comprises two opposite ends ((21, 22),(31, 32)),
  rotating connection means (7) comprising at least two selectable gear ratios (23/33, 24/34),
wherein a second end (22) of said first transmission shaft (2) is operatively connected/connectable with said axle (FA, IA, RA) for driving thereof, wherein a first end (21) of said first transmission shaft is connected/connectable with said output shaft of said gear box, and one of the ends (31, 32) of the second shaft (3) is operatively and directly connected/connectable with said at least one auxiliary motor (AM), and characterized in comprising
  control means (PTCU) for controlling at least said torque distributor to switch from a combustion traction mode to an electric traction mode, and for carrying out at least the following steps:
  (S1) acquisition of vehicle speed,
  if the vehicle speed is non-zero (S4 YES), then (S6) selection of the most appropriate gear ratio among said at least two selectable gear ratios (pairs 23/33 or 24/34),
wherein each one of said ends ((21, 22),(31, 32)) comprises connection means (21.A, 22.A, 31.A, 32.A) to an external transmission shaft and at least a clutch (25, 35, 26, 36) in order to allow one of said connection means (21.A, 22.A, 31.A, 32.A) to be connected/disconnected to/from its respective transmission shaft (2, 3).

2. Vehicle according to claim 1, wherein the internal combustion engine (CE) is arranged transversally with respect to the vehicle development and having the gearbox (GS) with a respective output shaft operatively connected with a front axle (FA).

3. Vehicle according to claim 1, wherein the axle includes a front axle (FA), a rear axle (RA) and at least an intermediate axle (IA) between said front axle (FA) and rear axle (RA).

4. Vehicle according to claim 3, wherein said torque distributor (1) has a first end (21) of said first shaft (2) operatively connected with said intermediate axle (IA).

5. Vehicle according to claim 1, wherein the internal combustion engine (CE) is arranged longitudinally with respect to the vehicle development and having the gearbox (GS) with a respective output shaft operatively connected with said first end (21) of said first shaft (2).

6. Vehicle according to claim 5, wherein said first end (31) of the second shaft (3) is operatively connected with a front axle (FA).

7. Vehicle according to claim 1, further comprising a front axle (FA), a rear axle (RA) and at least an intermediate axle (IA) between said front (FA) and rear axle (RA) and wherein the internal combustion engine (CE) is arranged longitudinally with respect to the vehicle development and having the gearbox (GS) with a respective output shaft operatively connected with said intermediate axle (IA).

8. Vehicle according to claim 7, wherein said intermediate axle (IA) is also operatively connected with said first end (21) of said first shaft (2).

9. Vehicle according to claim 1, wherein said control means carries out (S8) synchronizing of the first (2) and second transmission shafts (3) by controlling the actuation of the auxiliary motor (AM).

10. Vehicle according to claim 1, wherein said control means carries out the following steps before said gear ratio selection (S6):
  (S5 or S11)
    if the first end (21) of the first shaft is provided of a first clutch (25) then opening of said first clutch (25) or
    if first end (21) of the first shaft is not provided of the first clutch, then opening of a main clutch of the vehicle between the internal combustion engine (CE) and its respective gearbox (GS) and/or shift the gearbox (GS) in neutral.

11. Vehicle according to claim 1, wherein said control means carries out the step (S13) of downshifting to the lowest gear ratio (24/34) when the vehicle speed is zero (S4 NO).

12. Vehicle according to claim 1, wherein said auxiliary motor (AM) is electric and the vehicle further comprises a battery to supply said auxiliary motor and wherein said control means carries out the further following preliminary steps:
  (S1) acquisition of vehicle speed, ON/OFF state of the internal combustion engine (CE), batteries charging status SOC>threshold;
  (S2) if the battery charging is sufficient, the following step (S3) is performed, otherwise the procedure goes back to the previous step (S1);
  (S3) verification that there is no mechanical connection between the first (2) and second shaft (3), otherwise controlling said rotating connection means (7) in order to disconnect the first shaft (2) from the second shaft (3).

13. Vehicle according to claim 1, wherein said control means carries out the further following steps:
  (S10 or S14) stopping of the internal combustion engine and/or inhibition of its starting and (optionally) if the end of the second shaft (3), to which the auxiliary motor (AM) is connected, is provided of a second clutch (35, 36), then closing (S7 or S12) said second clutch (35, 36).

14. Vehicle according to claim 1, wherein said rotating connection means (7) of the torque distributor comprise at least a first gearwheel (33 or 34) coaxial with and fixed to one of said two transmission shafts (2,3) and an operatively corresponding second gearwheel (23 or 24) coaxial and rotatably associated to the other transmission shaft (3, 2), the gearwheels lying on the same plane and engaging reciprocally between each other in operating conditions and wherein the distributor (1) comprises selection means (4) to select said second gearwheel (23 or 24) making it fixed with respect to the other transmission shaft (3 or 2).

15. Vehicle according to claim 14, wherein said rotating connection means (7) comprise at least a third gearwheel (33 or 34) coaxial with and fixed to one of said two transmission shafts (2,3) and an operatively corresponding fourth gearwheel (23 or 24) coaxial and rotatably associated to the other transmission shaft (3, 2), the third and the fourth gearwheel lying on the same plane and engaging reciprocally between each other in operating conditions defining a second different gear ratio defined by said first and second gearwheel (23, 33 or 24, 34) and wherein said selection means (4) are suitable to select one or none of said second and fourth gearwheel (23 or 24) realizing said first or said second gear ratio or neutral.

16. Vehicle according to claim 14, wherein said selection means (4) is a dog-clutch.

17. Vehicle according to claim 16, wherein said selection means comprise a sleeve (42), integral in rotation with and axially sliding on one (2) of said transmission shafts, arranged between the second and the fourth gearwheel (23 and 24), comprising two opposite faces having teeth or inserts suitable to engage in the corresponding faces of the second or the fourth gearwheel (23, 24) to make one of them integral in rotation with the other of the transmission shafts (2, 3).

18. Vehicle according to claim 1, wherein said clutch (25, 35, 26, 36) is a dog-clutch.

19. Vehicle according to claim 1, further comprising block means (5) suitable to block in rotation one (2) of said transmission shafts (2, 3) with respect to an external case (10) of the torque distributor.

20. Vehicle according to claim 1, further comprising angular speed detection means for detecting at least angular speeds of the transmission shafts (2, 3).

21. Vehicle according to claim 1, wherein said control means (PTCU) comprise interfaces to said angular speed detection means, and wherein said control means (PTCU) controls said auxiliary motor in order to synchronize the rotation of the first (2) and of the second shaft (3) and/or of the second shaft and of the auxiliary motor (AM) in order to actuate said synchronization and to limit the torque delivered by the auxiliary motor to facilitate said disengagement/opening.

22. Vehicle according to claim 1, wherein said control means (PTCU) controls the switching to an internal combustion only traction mode, wherein said switching comprises the following steps:
(S20) acquisition of vehicle speed, ON/OFF state of the internal combustion engine (CE);
(S21) if vehicle speed is equal to zero (S21 YES)
(S22) verification that there is no mechanical connection between the first (2) and second shaft (3), otherwise activation of the selection means (4) to disconnect the shafts from each another (2, 3);
(S23) verification of the opening of a main clutch of the vehicle, otherwise opening of the main clutch of the vehicle;
(S24) internal combustion engine starting;
(S25) optional, if the first end of the first shaft is provided with a first clutch (25), closing of said first clutch (25);
(S26) optional, if the end of the second shaft, to which the auxiliary motor (AM) is connected, is provided of a second clutch (35, 36) then open said second clutch (35, 36);
if vehicle speed is not equal to zero (S21 NO) then the following steps are performed:
(S27) reduction of the torque delivered by the auxiliary motor below a specific value, to facilitate the mechanical disconnection of the gear ratios (23/33 or 24/34);
(S28) mechanical disconnection between said shafts (2, 3), after that steps 24 through 26 are performed.

23. Method for controlling the switching to an electric only traction mode of a hybrid vehicle provided with a front axle (FA) and a rear axle (RA),
an internal combustion engine (CE), with its own gear box (GS), said gear box (GS) having one single output shaft,
at least one auxiliary motor (AM),
a torque distributor, comprising
a first (2) and a second transmission shaft (3) parallel to each other, wherein each transmission shaft (2, 3) comprises two opposite ends ((21, 22),(31, 32)),
rotating connection means (7) comprising at least two selectable gear ratios (23/33, 24/34),
wherein a second end (22) of said first transmission shaft (2) is operatively connected/connectable with said rear axle (RA) for driving thereof, wherein a first end (21) of said first transmission shaft is connected/connectable with said output shaft of said gear box, and one of the ends (31, 32) of the second shaft (3) is operatively connected/connectable said at least one auxiliary motor (AM),
the method comprising at least the following steps:
(S1) acquisition of vehicle speed, ON/OFF state of the internal combustion engine (CE), batteries charging status (SOC>threshold);
(S2) if the battery charging is sufficient, the following steps are performed, otherwise the procedure goes back to the previous step (S1);
(S3) verification that there is no mechanical connection between the first (2) and second shaft (3), otherwise controlling said rotating connection means (7), specifically said selection means (4), in order to disconnect the first shaft (2) from the second shaft (3);
if the vehicle speed is non-zero (S4 YES), then the following steps are commanded:
(S5)
if the first end (21) of the first shaft is provided of a first clutch (25) then opening of said first clutch (25) or
if first end (21) of the first shaft is not provided of the first clutch, then opening of a main clutch of the vehicle between the internal combustion engine (CE) and its respective gearbox (GS) and/or shift the gearbox (GS) in neutral;
(S6) selection of the most appropriate fixed gear ratio (pairs 23/33 or 24/34),
(S7) optionally, if the end of the second shaft (3) to which the auxiliary motor (AM) is connected is provided with a second clutch, then, closing of said second clutch;
(S8) synchronization of the first (2) and second shaft (3),
(S9) shifting to the most appropriate gear ratio,
(S10) stopping of the internal combustion engine and inhibition of its starting;
if the vehicle is stationary (S4 NO) then the following steps are performed:
(S11)
if the first end (21) of the first shaft is provided of the first clutch (25) then opening of said first clutch (25) or
if first end (21) of the first shaft is not provided of the first clutch, then opening of the main clutch of the vehicle between the internal combustion engine (CE) and its respective gearbox (GS) and/or shift the gearbox (GS) in neutral;
(S12) optionally, if the end of the second shaft (3) to which the auxiliary motor (AM) is connected is provided with the second clutch (35, 36), then, closing of said second clutch (35, 36);
(S13) downshifting to a lowest gear ratio (24/34) in place of said selection (S6),
(S14) inhibition of the internal combustion engine from starting.

24. Computer program comprising non-transitory program code means, which when run on a computer, causes the computer to operate so as to perform the following steps:
(S1) acquisition of vehicle speed, ON/OFF state of the internal combustion engine (CE), batteries charging status (SOC>threshold);
(S2) if the battery charging is sufficient, the following steps are performed, otherwise the procedure goes back to the previous step (S1);
(S3) verification that there is no mechanical connection between a first shaft (2) and second shaft (3), wherein a first end (21) of said first shaft is connected/connectable with an output shaft of a gear box, otherwise controlling said rotating connection means (7), specifically said selection means (4), in order to disconnect the first shaft (2) from the second shaft (3);
(S4) if the vehicle speed is non-zero (S4 YES), then the following steps are commanded:
(S5)
  if the first end (21) of the first shaft is provided of a first clutch (25) then opening of said first clutch (25) or
  if first end (21) of the first shaft is not provided of the first clutch, then opening of a main clutch of the vehicle between the internal combustion engine (CE) and its respective gearbox (GS) and/or
  shift the gearbox (GS) in neutral;
(S6) selection of the most appropriate fixed gear ratio (pairs 23/33 or 24/34),
(S7) optionally, if the end of the second shaft (3) to which the auxiliary motor (AM) is connected is provided with a second clutch, then, closing of said second clutch;
(S8) synchronization of the first (2) and second shaft (3),
(S9) shifting to the most appropriate gear ratio,
(S10) stopping of the internal combustion engine and inhibition of its starting;
if the vehicle is stationary (S4 NO) then the following steps are performed:
(S11)
  if the first end (21) of the first shaft is provided of the first clutch (25) then opening of said first clutch (25) or
  if first end (21) of the first shaft is not provided of the first clutch, then opening of the main clutch of the vehicle between the internal combustion engine (CE) and its respective gearbox (GS) and/or
  shift the gearbox (GS) in neutral;
(S12) optionally, if the end of the second shaft (3) to which the auxiliary motor (AM) is connected is provided with the second clutch, then, closing of said second clutch (35, 36);
(S13) downshifting to a lowest gear ratio (24/34) in place of said selection (S6),
(S14) inhibition of the internal combustion engine from starting.

25. Non-transitory computer-readable means comprising a recorded program, said computer-readable means comprising program code means, which when run on a computer, causes the computer to operate so as to perform the following steps:
(S1) acquisition of vehicle speed, ON/OFF state of the internal combustion engine (CE), batteries charging status (SOC>threshold);
(S2) if the battery charging is sufficient, the following steps are performed, otherwise the procedure goes back to the previous step (S1);
(S3) verification that there is no mechanical connection between a first shaft (2) and second shaft (3), wherein a first end (21) of said first shaft is connected/connectable with an output shaft of a gear box, otherwise controlling said rotating connection means (7), specifically said selection means (4), in order to disconnect the first shaft (2) from the second shaft (3);
(S4) if the vehicle speed is non-zero (S4 YES), then the following steps are commanded:
(S5)
  if the first end (21) of the first shaft is provided of a first clutch (25) then opening of said first clutch (25) or
  if first end (21) of the first shaft is not provided of the first clutch, then opening of a main clutch of the vehicle between the internal combustion engine (CE) and its respective gearbox (GS) and/or
  shift the gearbox (GS) in neutral;
(S6) selection of the most appropriate fixed gear ratio (pairs 23/33 or 24/34),
(S7) optionally, if the end of the second shaft (3) to which the auxiliary motor (AM) is connected is provided with a second clutch, then, closing of said second clutch;
(S8) synchronization of the first (2) and second shaft (3),
(S9) shifting to the most appropriate gear ratio,
(S10) stopping of the internal combustion engine and inhibition of its starting;
if the vehicle is stationary (S4 NO) then the following steps are performed:
(S11)
  if the first end (21) of the first shaft is provided of the first clutch (25) then opening of said first clutch (25) or
  if first end (21) of the first shaft is not provided of the first clutch, then opening of the main clutch of the vehicle between the internal combustion engine (CE) and its respective gearbox (GS) and/or
  shift the gearbox (GS) in neutral;
(S12) optionally, if the end of the second shaft (3) to which the auxiliary motor (AM) is connected is provided with the second clutch (35, 36), then, closing of said second clutch (35, 36);
(S13) downshifting to a lowest gear ratio (24/34) in place of said selection (S6),
(S14) inhibition of the internal combustion engine from starting.

* * * * *